United States Patent Office 3,475,512
Patented Oct. 28, 1969

3,475,512
ORGANOSILICON-MODIFIED POLYESTERS CONTAINING UNSATURATED ALDEHYDES
Robert A. Baugh, Gibsonia, and John S. Ostrowski, Pittsburgh, Pa., assignors to PPG Industries, Inc., a corporation of Pennsylvania
No Drawing. Filed Mar. 30, 1967, Ser. No. 626,958
Int. Cl. C08g 31/06, 47/10
U.S. Cl. 260—827          10 Claims

ABSTRACT OF THE DISCLOSURE

Modified polyesters useful in coating compositions are made by reacting a part of the hydroxyl groups of saturated polyesters having a hydroxyl number of 200 or higher with an unsaturated aldehyde, preferably acrolein, and reacting part of the hydroxyl groups with an organosilicon compound (preferably an organopolysiloxane) which is reactive with hydroxyl groups. Polyesters containing pentaerythritol are preferred. Coatings from the compositions described cure at lower temperatures than conventional silicone-polyesters.

---

This invention relates to organosilicon-modified polyesters useful in coating compositions, and more particularly to such modified polyesters made by reacting a polyester of high hydroxyl number with an unsaturated aldehyde and an organosilicon compound.

The products of the present invention comprise an acetal-modified polyester made by reacting an ethylenically unsaturated aldehyde, such as acrolein, with part of the hydroxyl groups of a polyester of relatively high hydroxyl number. The polyester is further reacted with an organosilicon compound reactive with hydroxyl groups, so that at least part of the organosilicon compound is reacted with hydroxyl groups in the polyester. The product is an organosilicon-modified polyester containing acetal groups derived from the unsaturated aldehyde.

To exemplify the nature of the acetal-forming reaction, there is set forth below an illustrative equation of the reaction which is believed to take place in producing one of the preferred embodiments of the invention. As shown, a polyester containing an excess of hydroxyl groups derived from the inclusion in the polyester of a polyol such as pentaerythritol is reacted with acrolein:

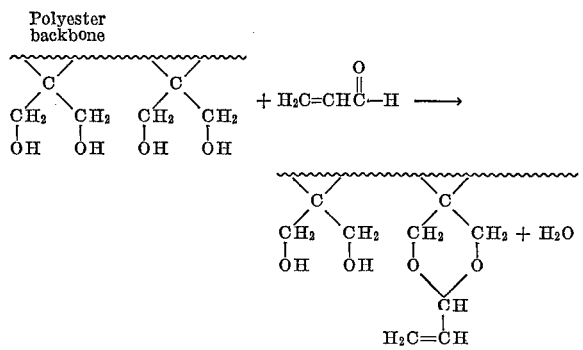

This polyester, containing acrolein acetal groups and hydroxyl groups, is reacted with a reactive organosilicon compound whereby hydroxyl, alkyl or other reactive groups of the organosilicon react with the hydroxyl groups of the acetal-containing polyester to produce a product containing coupled organosilicon moieties and acetal groups.

The foregoing is not intended to describe accurately the entire reaction or the exact structure of the product, which is obviously more complex than set forth. For example, some cross-linking may be involved, and some polymerization of the unsaturated groups may take place. Further, while the above illustrates the type reaction involved in this embodiment, other acetal structures can be obtained in other embodiments. For instance, a noncyclic acetal can be formed when the hydroxyl groups are not adjacent. Also, the sequence of reaction need not be as shown; in some cases, the acetal can be formed concurrently with or after the reaction with the organosilicon compound.

The products of the invention have a number of highly advantageous properties when used in coating compositions. They provide coatings which cure at lower temperatures than do conventional compositions based on organosilicon-modified polyesters or alkyds. Such conventional compositions require baking at 600° F. for 60 to 90 seconds for curing, this being higher than is attainable using most commercial installations for coating of aluminum or steel strip for siding, building panels, and the like. The improved products herein, however, cure in comparable times at 500° F. and are thus applicable with conventional commercial coating equipment. The lower curing temperatures of these compositions is attributed in large part to the presence of the acetal groups, which provide additional cross-linking sites.

Because of their properties, the modified polyesters of the invention are particularly useful as vehicles for paints for prefinished aluminum and steel products. In addition to their lower curing properties, paint compositions made with the modified polyesters herein as the major film forming component have excellent adhesion, durability and flexibility. Thus, they meet the rigorous requirements for coating for products which frequently are formed and fabricated after coating and which are often exposed to weathering during use.

The hydroxyl-containing polyester which is used as the base polymer for the formation of the acetal can be essentially any saturated polyester containing free hydroxyl groups, i.e., hydroxyl groups which are available for further reaction. By "saturated polyester" is meant a polyester made from a saturated or aromatic polycarboxylic acid, without any substantial amount of ethylenically unsaturated acid. The number of hydroxyl groups which the polyester should have depends upon the amount of aldehyde and organosilicon to be reacted with it. In general, it is preferred that the polymer have a hydroxyl number of at least about 200 (hydroxyl number can be determined by acetalylating the sample with acetic anhydride and then neutralizing with potassium hydroxide; the hydroxyl number is the number of milligrams of potassium hydroxide per gram of resin solids).

It is preferred that the polyester be nonoil-modified, or if modified with oil or fatty acids that it be modified with non-drying or essentially saturated fatty acids. The polyesters used herein are conventionally prepared by reacting a polyol with a polycarboxylic acid using ratios and reaction conditions so as to produce a polyester of the desired hydroxyl number. Preferred are polyesters made from polyols having 3 or more hydroxyl groups, since these provide polyesters having hydroxyl groups pendent on the polymer chain.

Pentaerythritol is a specific preferred polyol for use in making polyesters for use herein, but other polyols having, for example, 2 to 12 carbon atoms can also be used, including such polyols as glycerol, ethylene glycol, diethylene glycol, 1,2,6-hexanetriol, trimethylolpropane, dipentaerythritol, sorbitol, mannitol, and others. These are reacted with polycarboxylic acids (or their anhydrides) such as adipic acid, succinic acid, azelaic acid, phthalic acid, isophthalic acid, tetrachlorophthalic acid, trimellitic acid, and similar acids having, preferably, up to about 12 carbon atoms. As indicated above, if an oil-modified polyester is desired, the polyester may be modified with a non-drying oil, such as coconut oil, cottonseed oil, castor oil, or the like, or with corresponding fatty acids. The polyester is made using conventional techniques, provided only that the reaction is carried out so as to provide a product having the desired level of hydroxyl functionality.

Acrolein is greatly preferred as the unsaturated aldehyde. Other aldehydes containing a polymerizable ethylenic group, such as methacrolein, crotonaldehyde, etc. are less suitable because the reaction products obtained do not attain the properties achieved with acrolein, but they may be utilized in certain instances. Mixtures of aldehydes can also be employed. The amount of acrolein or other unsaturated aldehyde may be varied, depending upon the number of hydroxyl groups in the polyester and the amount of organosilicon to be incorporated. The proportion of hydroxyl groups reacted depends upon the hydroxyl number of the polyester, but usually from about 20 percent to 75 percent of the free hydroxyl groups are reacted with the aldehyde. In most cases, the acetal-modified polyester is produced using from about 3 percent to about 30 percent by weight of aldehyde, based on the total of the aldehyde and polyester; the preferred products contain from about 8 percent to about 15 percent of the aldehyde, on the same basis.

The acetal-containing product is ordinarily made by reacting the aldehyde with the preformed polyester. In producing the acetal-modified polymer in this manner, the polyester containing hydroxyl groups is usually reacted with the unsaturated aldehyde at elevated temperatures, e.g. from about 140° F. to about 320° F. It is desirable to include an acid catalyst, such as para-toluene sulfonic acid, phosphoric acid, or the like. In some instances, the polyester or other polymer is produced and reacted with aldehyde in the same reaction mixture by including the unsaturated aldehyde with the polymerization mixture, but this procedure may produce a product of high viscosity and having a tendency to discolor. When the process is carried out in this manner the use of a glycol should be avoided and an added catalyst is not employed when an acid such as phthalic acid or anhydride is present.

The polyester is further modified by reaction with an organosilicon compound which is reactive with hydroxyl groups. Such reactive organosilicon compounds typically contain hydroxyl or alkoxy groups attached to the silicon atoms.

Reaction with the oragnosilicon can be carried out at essentially any time during the preparation of the modified polyester. For example, the organosilicon compound can be added to the polyester or the polyester-forming components to produce a silicon-containing polyester, which is then further reacted with unsaturated aldehyde as described above, although generally the reaction with aldehyde is carried out prior to incorporation of the organosilicon compound. It is only necessary that some hydroxyl groups be available for reaction with at least part of the organosilicon compound. In the preferred procedure, the acetal-containing polyester and the organosilicon compound are mixed with suitable solvents in a reaction mixture of relatively high resin solids content (e.g., 50 percent or higher) and heated at a temperature of 250° F. to 350° F. until the mixture remains clear when cooled and has the desired viscosity.

The amount of organopolysiloxane or other organosilicon included with the interpolymer or coating composition can be varied widely. Even quite small amounts, e.g. 5 percent or even less, give some advantage, and the organosilicon compound may comprise up to about 75 percent or more of the total weight of modified polyester. Typically, the organosilicon compounds forms from about 20 to about 60 percent of the total weight of modified polyester.

Generally employed as the organosilicon compound is an organopolysiloxane resin. Such organosiloxane resins are well known in the art, and those which are typically employed in this invention conform to the general unit formula:

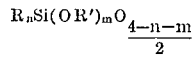

where R is a monovalent organic radical bonded to silicon by a carbon-to-silicon bond and R' is hydrogen, an alkyl radical, an aryl radical, or an acyl radical. The value of $n$ in the above formula is between about 0.5 and 1.9 and the value of $m$ between 0.01 and 2.5; the value of $m$ plus $n$ must be between 0.51 and 3.

The substituents represented by R in the above formula include, for example, monovalent hydrocarbon radicals such as methyl, ethyl, propyl, hexyl, octadecyl and similar alkyl radicals; monovalent cycloaliphatic radicals such as cyclohexyl and cyclopentyl; aryl radicals, for example, phenyl, methylphenyl, benzyl, and the like; alkenyl, for instance, vinyl, allyl, 3-butenyl, and linoleyl; cycloalkenyl radicals such as cyclopentadienyl; and alkenylaryl groups such as the vinyl phenyl radical. R may also be a substituted hydrocarbon radical, for example, a halo-substituted organic radical such as pentachlorophenyl, 1-bromo-3-trifluoropropyl, and delta-trifluoro-gamma-difluorobutyl, or it may be an amino-substituted hydrocarbon group such as aminomethyl, 3-aminopropyl, or the like. Other substituted hydrocarbon radicals which may be included within the scope of the R substituent are cyano-substituted hydrocarbon radicals such as 3-cyanopropyl, carboxyl-substituted radicals such as 3-carboxylpropyl, and sulfur-substituted radicals, including 3-mercaptopropyl, ethyl thioethyl, and ethyl sulfonylpropyl, as well as hydroxy-substituted radicals, such as hydroxypropyl.

The groups represented by R' include hydrogen and alkyl groups of 1 to 20 carbon atoms, such as methyl, ethyl, propyl, butyl, amyl, hexyl, heptyl and octyl. R' may also be an aryl radical such as phenyl, tolyl or halogen or other substituted phenyl, or an acyl radical such as acetyl, propionyl, butyryl or other similar acyl radicals, generally having between 1 and 8 carbon atoms.

Examples of organosiloxane resins and methods of producing them can be found in various publications as well as in patents such as U.S. Patents 2,268,218; 2,358,219; 2,258,222; 2,371,050; 2,389,477; 2,584,341; 2,663,694; 2,746,942; 2,768,149; and 3,015,637.

The preferred organosiloxane resins are those now commercially available, which usually contain phenyl and/or methyl substitution.

As indicated above, the modified polyesters obtained in accordance with the invention are especially useful in coating composition. When employed for this purpose, they can be utilized as clear finishes, in which case the polyester is simply applied from a solution of suitable viscosity and baked to provide a clear, hard, glossy film. Preferably, however, they are utilized as the sole or major film-forming component of pigmented coating compositions, containing any of the various conventional pigments employed in industrial paint compositions. Suitable solvents, fillers, curing catalysts, additives and the like are also incorporated in the coating composition if desired, and the compositions are applied to various substrates such as aluminum and steel by conventional techniques. Usually the coatings are cured by baking at 500° F. for 60 to 100 seconds, although there may be employed longer times at lower temperatures, and, conversely, shorter times at higher temperatures.

Set forth below are several examples of the method and practice of the invention. These are set forth as illustrative of the invention and are not to be construed as limitations thereon. All parts and percentages in the examples, as well as throughout the specification, are based on nonvolatile solids content and are by weight unless otherwise indicated.

EXAMPLE 1

The following were charged to a reaction vessel:

| | Parts by wt. |
|---|---|
| 1,6-hexanediol | 600 |
| Pentaerythritol | 1170 |
| Isophthalic acid | 1010 |
| Adipic acid | 300 |
| Xylene | 120 |

This mixture was refluxed for 14.5 hours while removing 302 parts of evolved water. There were then added 800 parts of Cellosolve acetate, 313 parts of acrolein, 2.14 parts of p-toluene sulfonic acid, and 74 parts of low boiling aliphatic hydrocarbon solvent. The resulting mixture was refluxed for 4 hours during which time 94 parts of water were removed. The product mixture was sparged with nitrogen, removing 100 parts of solvent, and then 1000 parts of Cellosolve acetate were added. The product had a total solids content of 61.9 percent, an acid value of 8.66 and a hydroxyl number of 348 (based on 100 percent solids).

One thousand parts of the above product were heated to 240° F. and then 600 parts of organosilicon compound were added along with 115 parts of Cellosolve acetate and 1.44 parts of tetraisopropyl titanate. The organosilicon compound was an intermediate type phenyl-substituted organopolysiloxane having an average molecular weight of 1600 and an average of about 4 hydroxyl groups per molecule; its unit formula is $$R_{1.00}Si(OH)_{0.4}O_{1.3}$$

This mixture was refluxed for 2 hours, then 270 parts of Cellosolve acetate were added and refluxing continued for ½ hour. During the reflux 23 parts of evolved water were removed. The product, after the addition of 390 parts of Cellosolve acetate, had a total solids content of 51.9 percent, an acid value of 6.21, a hydroxyl number of 162 (100 percent solids) and a Gardner-Holdt viscosity of L to M.

This product was pigmented with titanium dioxide at a pigment-to-binder ratio of 0.6 to 1 (based on solids) and tinted blue with 1 percent of phthalocyanine blue. A coating of the composition was then drawn on aluminum and galvanized steel panels to give a dry film thickness of 0.8 to 1.0 mil, and cured at 500° F. for 70 seconds. The coating had excellent properties, including good solvent resistant, hardness, gloss, flexibility and impact resistance.

EXAMPLE 2

Following the procedure of Example 1, a polyester was made and reacted with acrolein. The product obtained had a total solids content of 65.3 percent, an acid value of 11.98, a hydroxyl number of 257 (100 percent solids) and a Gardner-Holdt viscosity of Y to Z. One thousand parts of this product was reacted with 300 parts of the organopolysiloxane described in Example 1, using the procedure described in Example 1. A total of 12 parts of water were evolved, and the product obtained had the following properties:

| | |
|---|---|
| Total solids _____percent__ | 50.7 |
| Acid value | 8.68 |
| Viscosity (Gardner-Holdt) | U |
| Weight per gallon (lbs.) | 9.04 |

This product was pigmented as in Example 1, coated on aluminum and cured at 500° F. for 80 to 100 seconds. This coating also had excellent properties, including somewhat better hardness and flexibility than the coating of Example 1.

Other organosilicon compounds can be substituted for that in the above examples. For example, there can be used the resin known as Dow-Corning Z-6188, which is a methoxy-substituted organopolysiloxane, or the methyl and phenyl-substituted siloxane known commercially as SR-82 (General Electric), or dimethyltriphenyltrimethoxytrisiloxane, or other such compounds. Also, other procedures can be used to introduce the organosilicon compound, as described above.

Good results for many purposes are also obtained by using other polyesters having hydroxyl groups, containing various acids and polyols as described hereinabove, in place of that of the foregoing examples. Similarly other unsaturated aldehydes, and other pigments and additives can be substituted for those exemplified and other polymerization methods as known in the art can be utilized instead of those shown.

According to the provisions of the patent statutes, there are described above the invention and what are now considered to be its best embodiments. However, it is to be understood that the invention can be practiced otherwise than as specifically described.

We claim:

1. A method of producing a modified polyester which comprises reacting a polyester formed from one or more polyols and one or more saturated or aromatic polycarboxylic acids and having a hydroxyl number of at least about 200, with
    (1) from about 3 percent to about 30 percent of polymerizable ethylenically unsaturated aldehyde selected from the group consisting of acrolein, methacrolein and crotonaldehyde, based on the total weight of the aldehyde and polyester, and
    (2) form about 5 percent to about 75 percent, based on the total weight of the reaction product, of an organopolysiloxane reactive with hydroxyl groups having the unit formula $$R_nSi(OR')_mO_{\frac{4-n-m}{2}}$$

where R is a monovalent organic radical bonded to silicon by a carbon-to-silicon bond, R' is hydrogen, alkyl of 1 to 20 carbon atoms, aryl or acyl of 1 to 8 carbon atoms; the value of $n$ is between 0.5 to 1.9; the value of $m$ is between 0.01 and 2.5; and the value of $n$ plus $m$ is between 0.51 and 3.

2. The method of claim 1 in which the unsaturated aldehyde is acrolein.

3. The method of claim 1 in which the polyol component of the polyester is comprised of pentaerythritol.

4. A method of producing a modified polyester which consists essentially of reacting an oil-free polyester formed from one or more polyols and one or more saturated or aromatic dicarboxylic acids and having a hydroxyl number of at least about 200, with
    (1) acrolein, in an amount between about 3 percent and about 30 percent by weight, based on the total weight of acrolein and polyester, and
    (2) from about 5 to about 75 percent, based on the total weight of reaction product, of an organosiloxane reactive with hydroxyl groups and having the unit formula $$R_nSi(OR')_mO_{\frac{4-n-m}{2}}$$

where R is a monovalent organic radical bonded to silicon by a carbon-to-silicon bond, R' is hydrogen, alkyl of 1 to 20 carbon atoms, aryl or acyl of 1 to 8 carbon atoms; the value of $n$ is between 0.5 and 1.9; the value of $m$ is between 0.001 and 2.5; and the value of $n$ plus $m$ is between 0.51 and 3.

5. The method of claim 4 in which the polyol component of the polyester is comprised of pentaerythritol.

6. The method of claim 4 in which the organopolysiloxane contains phenyl groups, methyl groups or both.

7. The modified polyester formed by the method of claim 1.

8. The modified polyester formed by the method of claim 4.

9. A metal surface having thereon an adherent cured layer comprising the modified polyester of claim 7.

10. An article having at least one metal surface having thereon an adherent cured layer comprising the modified polyester of claim 9.

References Cited

UNITED STATES PATENTS

| | | | |
|---|---|---|---|
| 2,821,518 | 1/1958 | Edelman et al. | 260—824 |
| 3,010,918 | 11/1961 | Ikeda | 260—827 |
| 3,015,637 | 1/1962 | Rauner et al. | 260—824 |
| 3,123,578 | 3/1964 | Kraft | 260—22 |
| 3,255,210 | 6/1966 | Ikeda | 260—827 |

SAMUEL H. BLECH, Primary Examiner

U.S. Cl. X.R.

117—132; 260—22, 33.6, 67, 40, 824